United States Patent
Yoon et al.

(10) Patent No.: US 7,343,433 B2
(45) Date of Patent: Mar. 11, 2008

(54) METHOD AND APPARATUS FOR CONTROLLING AMOUNT OF BUFFER DATA IN A RECEIVER OF A DATA COMMUNICATION SYSTEM, AND METHOD AND APPARATUS FOR PLAYING STREAMING DATA WITH ADAPTIVE CLOCK SYNCHRONIZATION UNIT

(75) Inventors: Hyun-sik Yoon, Seoul (KR); Sang-sun Choi, Seoul (KR); Hee-tak Shin, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 11/003,351

(22) Filed: Dec. 6, 2004

(65) Prior Publication Data

US 2005/0138459 A1    Jun. 23, 2005

(30) Foreign Application Priority Data

Dec. 8, 2003    (KR) ...................... 10-2003-0088752

(51) Int. Cl.
*G06F 3/00*     (2006.01)
*G06F 13/00*    (2006.01)
(52) U.S. Cl. .................. 710/52; 710/310; 713/600
(58) Field of Classification Search ........ 713/375–600;
709/234–237; 710/60–61, 52–57, 308–310;
360/51–53
See application file for complete search history.

(56) References Cited

U.S. PATENT DOCUMENTS

| | | | |
|---|---|---|---|
| 5,473,385 A | | 12/1995 | Leske |
| 5,787,259 A | * | 7/1998 | Haroun et al. ............... 709/253 |
| 5,944,801 A | * | 8/1999 | Gulick ......................... 710/29 |
| 6,061,768 A | * | 5/2000 | Kuo et al. .................... 711/156 |
| 6,233,226 B1 | * | 5/2001 | Gringeri et al. ............. 370/252 |
| 6,266,338 B1 | * | 7/2001 | Simon et al. ................ 370/412 |
| 6,456,702 B2 | | 9/2002 | Nishihara |
| 6,757,292 B2 | * | 6/2004 | Pate et al. ................... 370/412 |
| 7,155,532 B2 | * | 12/2006 | Schoenblum ................ 709/231 |
| 2003/0002609 A1 | | 1/2003 | Faller et al. |

FOREIGN PATENT DOCUMENTS

| | | |
|---|---|---|
| JP | 11112982 A | 4/1999 |
| KR | 2002-0020955 A | 3/2002 |

* cited by examiner

*Primary Examiner*—Christopher Shin
(74) *Attorney, Agent, or Firm*—Sughrue Mion, PLLC

(57) ABSTRACT

A method and apparatus for controlling an amount of buffer data in a receiver of a data communication system, and a method and apparatus for playing back streaming data stored in a buffer, using an adaptive clock synchronization unit. The apparatus for controlling an amount of buffer data in a receiver of a data communication system includes a buffer for temporarily storing data, an adaptive rate determination unit for determining a rate at which data is used using operating conditions of the receiver and an amount of data stored in the buffer, and a data utilization unit for utilizing the data stored in the buffer at the determined rate. The method for adaptively controlling an amount of buffer data in a receiver of a data communication system, comprising determining a rate at which data stored in a buffer are used, considering operating conditions of a receiver and an amount of data stored in a buffer, and utilizing the data stored in the buffer at the determined rate.

25 Claims, 11 Drawing Sheets

METHOD AND APPARATUS FOR CONTROLLING AMOUNT OF BUFFER DATA IN A RECEIVER OF A DATA COMMUNICATION SYSTEM, AND METHOD AND APPARATUS FOR PLAYING STREAMING DATA WITH ADAPTIVE CLOCK SYNCHRONIZATION UNIT

CROSS-REFERENCE TO RELATED APPLICATION

This application claims priority from Korean Patent Application No. 10-2003-0088753 filed on Dec. 8, 2003 in the Korean Intellectual Property Office, the disclosure of which is incorporated herein by reference in its entirety.

BACKGROUND OF THE INVENTION

1. Field of the Invention

The present invention relates to a method and apparatus for controlling an amount of buffer data in a receiver of a data communication system, and a method and apparatus for playing back streaming data stored in a buffer, using an adaptive clock synchronization unit, and more particularly, to a streaming data playback method and apparatus with an adaptive clock synchronization function.

2. Description of the Related Art

For many decades, images and audio sound have been transmitted as analog signals. Nowadays, however, most videos are expressed and recorded as digital signals owing to several advantages. Digital signals of images and audio sound are transmitted through satellite broadcasting, terrestrial broadcasting or cable broadcasting, and users enjoy such digitalized images and audio sound using a set top box and a digital television.

Meanwhile, as internet technologies have been developed, the market for video-on-demand (VOD) services such as Internet-theater and Internet-music appreciation centers is expanding. Users can enjoy movies and music in real-time using a computer while VOD service providers are transmitting the movies and music in a format of streaming data over the Internet.

Digital televisions and VOD services are common in an aspect that users can enjoy images and music using streaming data transmitted over the Internet or a wireless transmission system.

FIG. 1 is a functional block diagram of a conventional streaming data transmission and receiving system.

The conventional streaming data transmission and receiving system of FIG. 1 comprises a streaming data transmitter 10 for transmitting streaming data and a streaming data receiver 20 for receiving and processing streaming data transmitted through a transmission medium. In this application, the term "streaming data" means data, images and audio sound, transmitted in real-time.

The streaming data transmitter 10 includes a streaming data generation unit 12 for generating streaming data, and a streaming data transmission unit 14 for transmitting the generated streaming data. The streaming data generation unit 12 encodes motion pictures and audio sound according to a Motion Picture Expert Group 2 (MPEG-2) compression algorithm. The encoded streaming data are transmitted through a transmission medium via a streaming data transmission unit 14.

The streaming data receiver 20 receives the transmitted streaming data and decodes the streaming data into motion pictures and audio sound. The streaming data receiver 20 comprises a streaming data receiving unit 22 for receiving the streaming data transmitted in real-time through a transmission medium, a buffer 24 for temporarily storing the received streaming data, a clock synchronization unit 26 for generating a clock synchronized with a playback time of the streaming data, and a playback unit 28 for decoding the streaming data and playing back the decoded data in synchronization with the clock.

The transmission media may include wire media as well as wireless media. For both wire and wireless media, the data transmission rate increases or decreases based on the total amount of data being transmitted through the media, the total amount of data being varied since the media are shared by a plurality of data communication systems. Particularly, in the case of using wireless media, data can be lost or damaged by noise while being transmitted. The receiving unit 22 of the receiver 20 neglects the lost or damaged part of data or requests the transmitter 10 to retransmit the lost or damaged data. In the case of neglecting the lost or damaged part of data, User Datagram Protocol (UDP) or Real-time Transport Protocol (RTP) which is an upper layer of the UDP is used. In the case of requesting the transmitter 10 to retransmit the lost or damaged data, Transmission Control Protocol (TCP) is used. Generally, streaming data transmission and receiving systems use the UDP or RTP.

If a data transmission is delayed due to data damage or data resubmission, or the data transmission rate decreases due to data congestion on the transmission media shared by many data communication systems, screen breaking can be caused in the receiver 20. Accordingly, the buffer 24 is needed to avoid screen breaking. The receiver 20 first stores a predetermined amount of data in the buffer and then starts to play back streaming data in real-time. By storing the streaming data before playing back the data, screen breaking can be avoided even if there is a data loss across transmission media, which often requires re-transmission, or transmission delay due to changes in transmission conditions.

Even though the buffer can prevent screen breaking that would be caused by transmission delay or reserve leeway of data retransmission time, further problems may arise. That is, for real-time playback of streaming data, an initial delay time for filling a buffer with streaming data is needed and such delay time can frustrate a user when the user wants to enjoy motion pictures or music in real-time. Particularly, when a user retrieves a specific scene in a movie, the user can see the retrieved scene only after all the pictures of the movie have been buffered. Further, the user can retrieve another scene only after deleting existing buffered data in the buffer and newly buffering streaming data. This makes a user even more frustrated. Further, the data transmission rate may be unavoidably decreased while a user watches a movie using the streaming data due to certain conditions of transmission media. In such a case, if the amount of data stored in the buffer falls below a predetermined level, a streaming data player temporarily stops the movie and replays it after filling the buffer with data to a predetermined amount.

To reduce an initial buffering time, which is a time period needed for buffering a minimum limit of data amount to start playing streaming data, or to maintain the amount of data stored in a buffer at a predetermined level, a clock control method which increases or decreases clock frequencies has been used. Japanese Patent Application Laid-Open Publication No. 1999-112982 discloses an exemplary method of reducing screen breaking events caused due to underflow or overflow of a buffer, which calculates the average amount of data in a buffer and controls a clock when the average amount is not within an allowed range. U.S. Patent Published Application No. 2003-0002609 discloses a method of controlling a clock for a receiver, which uses a feed-back loop and compares a predicted amount of data to be received from a transmitter and an actual amount of data in a decoder buffer. Further, methods for reducing underflow or overflow events by controlling clock frequencies are disclosed in U.S. Pat. Nos. 6,456,702 and 5,473,385 and Korean Patent Published Application No. 2002-0020955.

The methods disclosed in the above-stated patents and/or patent applications compensate for a clock frequency by comparing the amount of data stored in a buffer of a receiver and a reference amount of data. That is to say, in regard to the conventional methods, environmental factors affecting streaming data receivers are scarcely taken into consideration, which will briefly be explained by way of example. When a user searches a movie several times to get a certain scene from the movie, a shorter initial buffering time is preferred. When the transmission conditions are stable, it is not necessary to perform clock frequency control. However, the conventional methods do not consider such operation conditions of receivers. Accordingly, there is a need for methods and apparatuses for adaptively controlling the amount of buffer data in a buffer according to conditions of the environment under which a streaming data receiver operates.

SUMMARY OF THE INVENTION

To solve the above-described problems, the present invention provides a streaming data playback method and apparatus for adaptively controlling buffering operations considering environmental conditions under which a streaming data receiver operates.

In accordance with an aspect of the present invention, there is provided a method of controlling an amount of buffer data in a receiver of a data communication system, comprising determining a rate at which data stored in a buffer are used, considering operating conditions of a receiver and an amount of data stored in a buffer, and utilizing the data stored in the buffer at the determined rate.

The operating conditions of the receiver may include at least one of a number of overflow/underflow events and network stability of a communication system, and wherein the rate of utilizing data is determined by choosing a function based on the operating conditions, inputting the amount of data stored in the buffer into the function and computing the function.

The determined rate is expressed as a clock frequency and the receiver plays back the data stored in the buffer at the clock frequency.

In accordance with another aspect of the present invention, there is provided an apparatus for controlling an amount of buffer data in a receiver of a data communication system, comprising a buffer for temporarily storing data, an adaptive rate determination unit for determining a rate at which data is used using operating conditions of the receiver and an amount of data stored in the buffer, and a data utilization unit for utilizing the data stored in the buffer at the determined rate. Here, the data are streaming data and the receiver is an apparatus for playing back the data stored in the buffer.

The adaptive rate determination unit determines a function based on operating conditions of the receiver including at least one of a number of overflow/underflow events and the network stability of a communication system, determines the rate of data stored in the buffer by choosing a function based on the operating conditions, inputting the amount of data stored in the buffer into the function and computing the function, and provides the determined data rate to the data utilization unit. The determined rate is expressed as a clock frequency and the receiver plays back the data stored in the buffer at the clock frequency.

In accordance with still another aspect of the present invention, there is provided a method for playing back streaming data, comprising storing streaming data received in real-time in a buffer, determining a clock frequency using an amount of data stored in the buffer and operation conditions of a receiver, and generating a clock with the determined clock frequency, and playing back the data stored in the buffer in synchronization with the determined clock. The data stored in the buffer is preferably MPEG data, the playing back of the data may comprise decoding the data stored in the buffer in synchronization with the determined clock, and playing back the decoded data.

The operating conditions of the receiver may include at least one of a number of overflow/underflow events and network stability of a communication system, and the storing of streaming data comprises determining a clock control function based on the operating conditions, inputting the amount of data stored in the buffer into the determined clock control function to obtain the clock frequency and generating clocks corresponding thereto.

In the storing of streaming data, the order of the clock control function is preferably determined based on the information on occurrence of the overflow/underflow events.

In addition, in the storing of streaming data, the maximum limit and the minimum limit of data amount, which are reference levels of a buffer data amount range in which the amount of buffer data is output with constant frequency, is preferably determined by the clock control function based on the information on network stability.

The storing of streaming data may comprise determining the clock control function using at least one of information regarding the occurrence of the overflow/underflow events and information regarding network stability, determining the clock frequency by inputting the amount of buffer data to the clock control function, and generating a clock corresponding to the determined clock frequency.

In generating a clock, the clock may be generated by inputting a voltage representing the clock frequency determined during the determination of the clock frequency to a voltage controlled oscillator (VCO).

In accordance with a further aspect of the present invention, there is provided an apparatus for playing back streaming data in a real-time basis, comprising a buffer for temporarily storing data received in real-time by a receiver, an adaptive clock synchronization unit for determining a clock frequency using an amount of data stored in the buffer and operating conditions of the receiver, and generating a clock with the determined clock frequency, and a play back unit for playing back the data stored in the buffer in synchronization with the generated clock. Here, the data stored in the buffer is MPEG data, the playing back of the data comprises decoding the data stored in the buffer in synchronization with the determined clock, and playing back the decoded data.

The adaptive clock synchronization unit receives operating conditions of the receiver including at least one of a number of overflow/underflow events and network stability of a communication system, determines a clock control function based on the received operating conditions, obtains a clock frequency by inputting the amount of data stored in the buffer into the clock control function, and generates a clock corresponding to the clock frequency.

In addition, the adaptive clock synchronization unit determines the order of the clock control function based on the information regarding the occurrence of the overflow/underflow events. Also, the adaptive clock synchronization unit determines the maximum limit and the minimum limit of a data amount, which are reference levels of a buffer data amount range in which the amount of buffer data is output with a constant frequency, by the clock control function based on the information on network stability.

The adaptive clock synchronization unit may comprise a clock administration unit for determining a clock control function, considering operating conditions of the streaming data receiver, a clock control ratio determination unit for determining a clock control ratio based on the amount of buffer data stored in the buffer using the clock control function, and a clock generation unit for generating clocks with a frequency which is calculated by multiplying the clock control ratio by a reference clock frequency. Meanwhile, the clock generation unit may comprise a voltage controlled oscillator (VCO) for generating a clock with different frequencies according to voltages applied thereto, and a voltage supply device for generating different voltages to be applied to the VCO according to the clock control ratio received from the clock control ratio determination unit.

BRIEF DESCRIPTION OF THE DRAWINGS

The above objects and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which an exemplary embodiment of the invention is shown.

Figure 1:
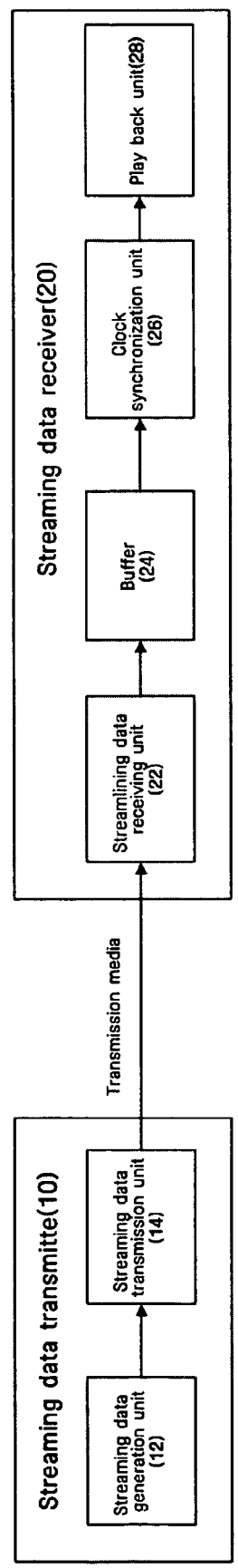
FIG. 1 is a functional block diagram of a conventional streaming data transmission and receiving system.
Figure 2:
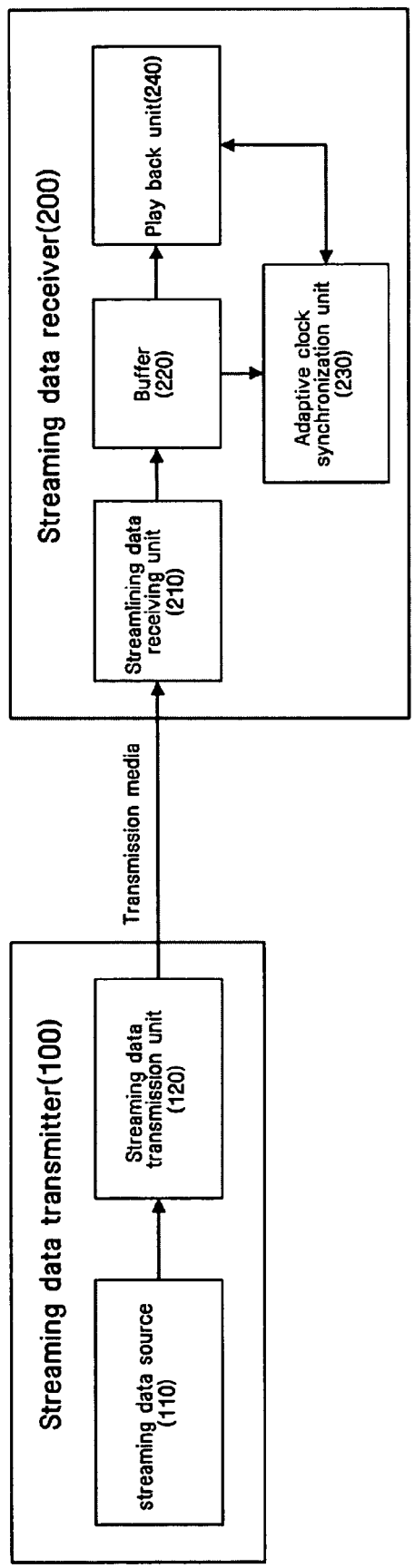
FIG. 2 is a functional block diagram of a streaming data transmission and receiving system according to the present invention.

FIG. 2 is a functional block diagram of a streaming data transmission and receiving system according to the present invention.

Referring to FIG. 2, the streaming data transmission and receiving system largely comprises a streaming data transmitter 100 and a streaming data receiver 200.

The streaming data transmitter 100 includes a streaming data source 110 and a streaming data transmission unit 120 for transmitting streaming data received from the streaming data source 110. The streaming data source 110 can be an encoder for encoding video signals of moving pictures and audio signals according to an MPEG-2, MPEG-4, or H2.64 coding method. Further, the streaming data source 110 can be a receiver for receiving encoded data in real-time from other devices. The streaming data transmission unit 120 receives streaming data from the streaming data source 110 and transmits the received streaming data to the streaming data receiver 200 over transmission media. The transmission media includes wired media such as the Internet, wire-less media for transmitting electric waves and infrared ray transmission media.

The streaming data receiver 200 receives and decodes the streaming data transmitted through the transmission media, and plays back the decoded streaming data. The streaming data receiver 200 comprises a streaming data receiving unit 210 for receiving the streaming data transmitted through the transmission media, a buffer 220 for temporarily storing the received streaming data, an adaptive clock synchronization unit 230 for generating a clock, and a play back unit 240 for decoding the streaming data stored in the buffer 220 and playing back the decoded data. The streaming data receiving unit 210 can be a channel decoder for satellite broadcasting or a computer network card for terrestrial broadcasting. The streaming data received by the streaming data receiving unit 210 are stored in the buffer 220. If the buffer 220 has a large capacity, problems arise in relation to underflow events. However, if the buffer 220 has a small capacity, problems arise in relation to overflow events. The play back unit 240 decodes the streaming data in the buffer 220 and plays back motion pictures, audio sound, text and other data in synchronization with the clock generated by the adaptive clock synchronization unit 230. The adaptive clock synchronization unit 230 will be described in more detail with reference to FIG. 3.

Figure 3:
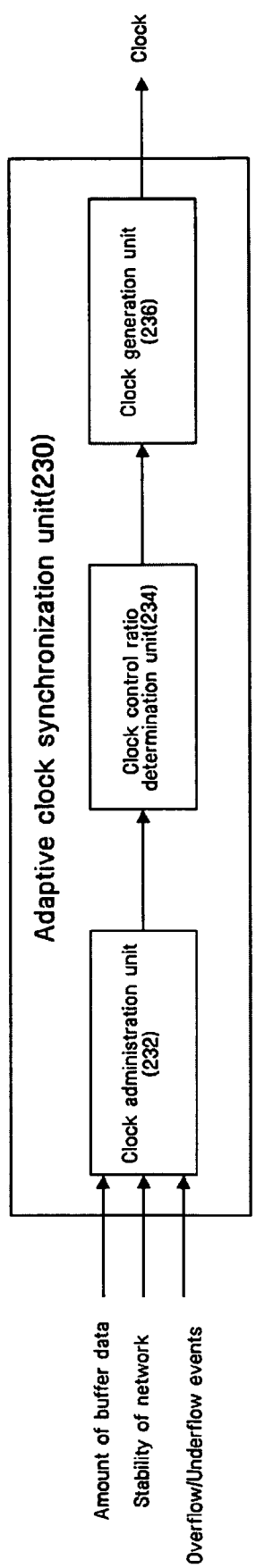
FIG. 3 is a functional block diagram of an adaptive clock synchronization unit shown in FIG. 2.

FIG. 3 is a functional block diagram of the adaptive clock synchronization unit 230.

Referring to FIG. 3, the adaptive clock synchronization unit 230 comprises a clock administration unit 232 for determining a clock control function, considering operating conditions of the streaming data receiver 200, a clock control ratio determination unit 234 for determining a clock control ratio based on the amount of buffer data stored in the buffer 220 using the clock control function, and a clock generation unit 236 for generating clocks with a frequency which is calculated by multiplying the clock control ratio by a reference clock frequency.

For clarity of the invention, definitions of terms used in the following discussion will first be given.

The term "overflow" means that input data is written to a buffer and if the input data is longer than the buffer size, the data beyond the end of the buffer is discarded. If there are overflow events, screen breaking can be caused due to the discarded data.

The term "underflow" means that streaming data is filled into the buffer in an amount less than an initial playback amount. If the underflow event is caused, play back of streaming data is ceased until the buffer is filed with enough data to exceed the initial play back amount of streaming data in the buffer.

The clock control function is a function for determining clock frequency of data to be output from the buffer based on the amount of buffer data stored in a buffer. Details of the clock control function will be described with reference to FIGS. 5A through 5D. The clock control function changes according to operation conditions of a streaming data receiver, which include the number of times overflow and underflow occurs. By using the clock control function, the streaming data receiver can adaptively buffer streaming data based on its operation conditions.

The term "maximum limit" and minimum limit" mean reference levels of the amount of data, from which clock control is started. By introducing the concept of the maximum limit and minimum limit, the method and apparatus according to the present invention can adaptively change the clock control range according to transmission environments.

The term "clock control ratio" is a ratio of a frequency of a clock generated by the clock synchronization unit to a reference frequency of a clock for play back of streaming data. If a clock control ratio is 0.8, a clock actually generated is slower than a reference clock for playing back streaming data by 20%. In the case of MPEG2, for example, encoding and decoding are both accomplished at the rate of 27 MHz. If the clock control ratio is 0.9, encoding is performed at 27 MHz but decoding is performed at 24.3 MHz which is 0.9 times 27 MHz.

The term "amount of buffer data" means the amount of data stored in a buffer. The amount of excess buffer data is the difference between the amount of buffer data and a recommended reference amount of data in the buffer. After determining the excess buffer data, the clock control ratio is determined.

Information on network stability is expressed as an extent of real-time buffer data deviated from the range between the maximum limit and the minimum limit. In the case of a streaming data receiver connected to a network using transmission media ensuring stable quality of service (QoS), events in which the amount of buffer data is not in the range between the maximum limit and minimum limit are rarely caused while playing back the streaming data. In such cases, it is preferable to reduce clock frequency control events by increasing the range between the maximum limit and the minimum limit. Thus, a user can appreciate motion pictures being played back with constant frequency.

The clock administration unit 232 is provided with information on the amount of buffer data, overflow/underflow events, and network stability. The clock administration unit 232 checks whether streaming data in the buffer is sufficient or not from the amount of buffer data. The overflow/underflow event is also important information to determine the clock control function. For example, when a user retrieves motion pictures several times to select certain scenes, the underflow events can often be caused for a predetermined period of time. In such a case, a clock control function that fills the streaming data into the buffer in real-time so as to reach an initial data amount for playback as soon as possible should be selected. The network stability information is used to determine the ranges of the amount of data that need clock control and do not need clock control, respectively.

The clock control ratio determination unit 234 determines the clock control ratio using the clock control function determined by the clock administration unit 232 and the amount of buffer data.

The clock generation unit 236 generates a clock with a frequency calculated by multiplying an adjusted clock control ratio by a reference clock frequency for encoding which is referred to as encoding frequency. The generated clock is transferred to the play back unit 240 for playing back the streaming data.

The clock generation unit 236 can be implemented by an oscillator for generating a clock with a second frequency higher than a first frequency which is the encoding frequency, an adder for summing the number of cycles of the clock with the second frequency, and a clock generator for alternatively outputting values "0" and "1" if the sum of the number of the cycles is greater than a reference number of cycles. For example, it is assumed that the encoding frequency is 10 MHz and the second frequency is 100 MHz. If the reference number of cycles is 10, the clock generator alternately generates values "0" and "1" every 10 cycles of an oscillator of 100 MHz. If the reference number of cycles is 9, the clock generator generates a clock with a frequency of 100/9=11.1 MHz. That is, the frequency of the clock generated by the clock generator is higher than the encoding frequency by about 11%. If the reference number of cycles is 11, the clock generator generates a clock with a frequency of 100/11=9.1 MHz. That is, the frequency of the generated clock is 9% less than the encoding frequency. If the reference number of the cycles is 10, the clock control ratio will be 1. If the reference number of cycles is 11, the clock control ratio will be 0.91. If the reference number is 9, the clock control ratio will be 1.11. After the clock control ratio is determined, by controlling the reference number of cycles of the oscillator, the frequency of the clock to be generated by the clock generation unit 236 can be controlled to match with the frequency which is calculated by using the clock control ratio.

The clock generation unit 236 can be realized by a combination of an oscillator, an adder and a clock generator. In addition, the clock generation unit 236 can be realized by a voltage controlled oscillator (VCO) and a voltage supply device for determining a voltage to be applied to the VCO based on the clock control ratio. The VCO generates a clock with different frequencies according to the voltages applied thereto. Since the clock generation unit 236 has the voltage supply device for generating different voltages to be applied to the VCO according to the clock control ratio, the clock generation unit 236 can generate a clock with a controlled clock frequency. Thus, to realize such a mechanism, the VCO determines the relationship between the applied voltages and the generated clock frequencies. The relationship is the property determined by a design of the VCO. The voltage supply device is designed to generate a voltage corresponding to the clock frequency to be generated by the VCO when a certain clock control ratio is received. The clock generation unit 236 realized as described above can generate a clock which is controlled based on the clock control ratio. The clock control process will be described with reference to FIG. 4.

Figure 4:
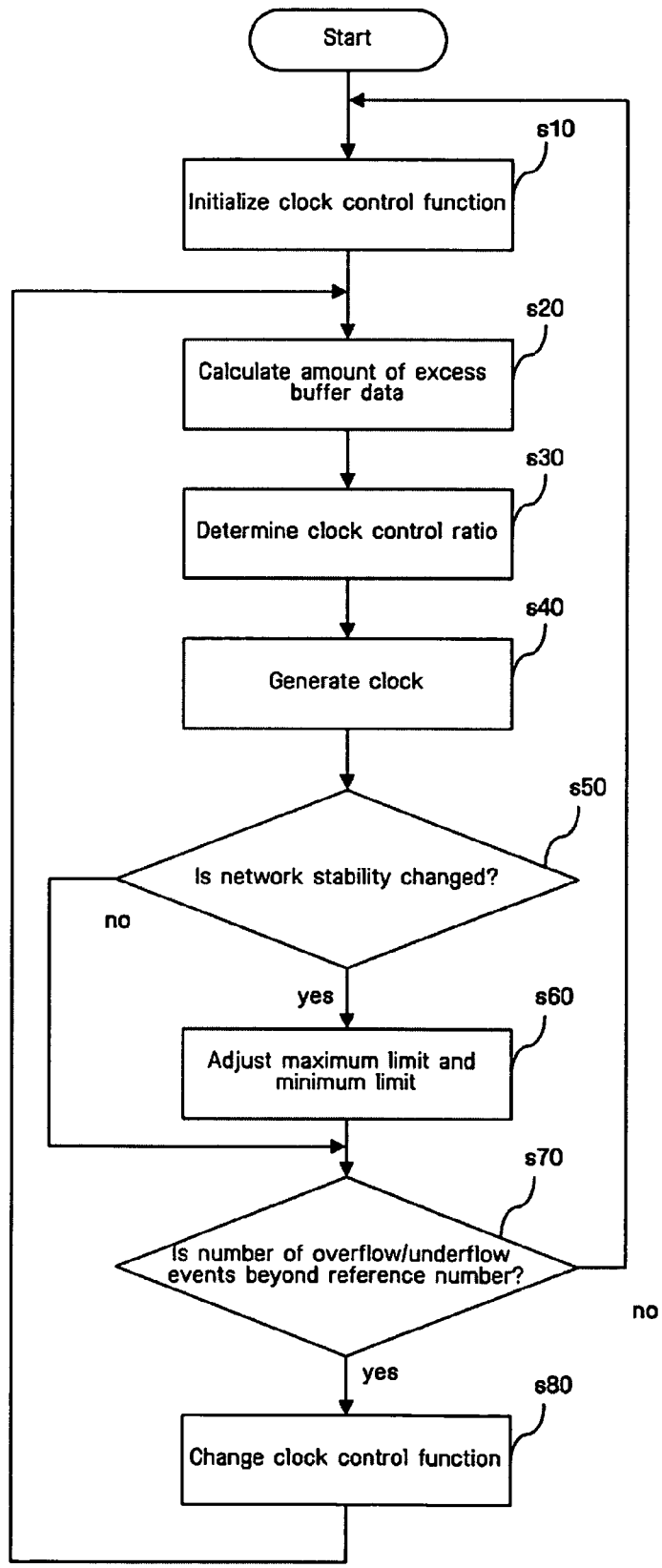
FIG. 4 is a flow chart showing a method of controlling a clock according to one embodiment of the present invention.

FIG. 4 illustrates a clock control process according to an exemplary embodiment of the present invention.

To generate a clock, a clock control function is initialized in step s10. The clock control function is determined out of a plurality of different clock control functions by the initialization. The clock control function will be described below in detail with reference to FIG. 5.

After initialization of the clock control function, an amount of excess buffer data is calculated in step s20. The amount of excess buffer data is calculated by obtaining the difference between the amount of buffer data currently stored in the buffer and the suitable amount of buffer data.

After calculating the amount of excess buffer data, a clock control ratio is determined by inputting the amount of excess buffer data into the clock control function in step s30. The clock control ratio means a ratio of a clock frequency to be generated by the clock generation unit 236 to the encoding clock frequency.

After determining the clock control ratio, a clock with a frequency which equals the encoding frequency multiplied by the clock control ratio is generated in step s40. Streaming data is played back in synchronization with the generated clock.

During steps s10 to s40, it is checked whether network stability is changed in step s50. If the network stability is changed, the maximum limit and the minimum limit of buffer data are adjusted in step s60. The network stability means an extent of QoS ensured. For example, if a certain QoS is ensured and the amount of streaming data stored in the buffer is kept constant, there is less possibility of overflow/underflow events even if the amount of buffer data is momentarily increased or decreased. In such a case, if possible, it is preferred that the clock frequency is not changed and the encoding frequency is used to play back the streaming data as it is.

Meanwhile, the number of overflow/underflow events occurring in a predetermined time is determined, and then it is checked whether the number of overflow/underflow events is greater than a reference number in step s70. If the number of the overflow/underflow events is greater than the reference number, the clock control function is changed in step s80. Frequent occurrence of overflow/underflow events indicates that the operating conditions of the streaming data receiver are changed. For example, overflow events are frequently caused when the transmission channel is in good condition and the transmission rate of streaming data transmitted in real-time is not well adjusted. Further, underflow events are often caused when a user retrieves certain scenes of motion pictures. During retrieval of motion pictures, it is important that initial delay time for buffering an initial amount of data for play back is reduced, and reducing the initial delay time is accomplished by changing the clock control function. The method for determining clock control function will be described below with reference to FIGS. 5A through 5D.

FIGS. 5A through 5D show examples of a variety of different adaptive clock control functions.

Figure 5A:
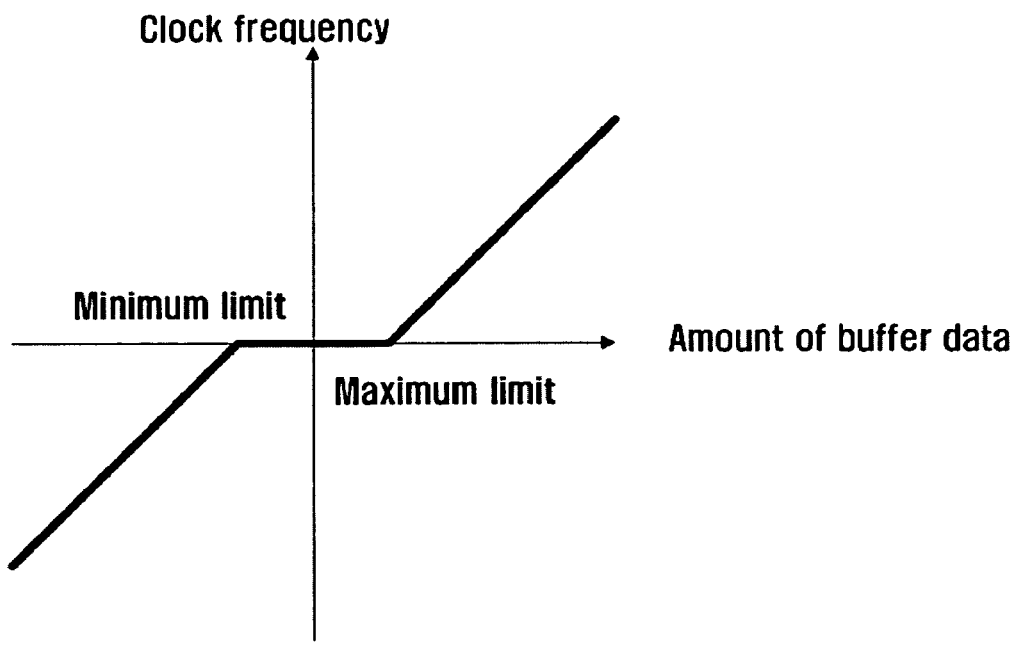
FIGS. 5A through 5D illustrate graphs showing adaptive clock control functions according to the present invention.
Figure 5B:
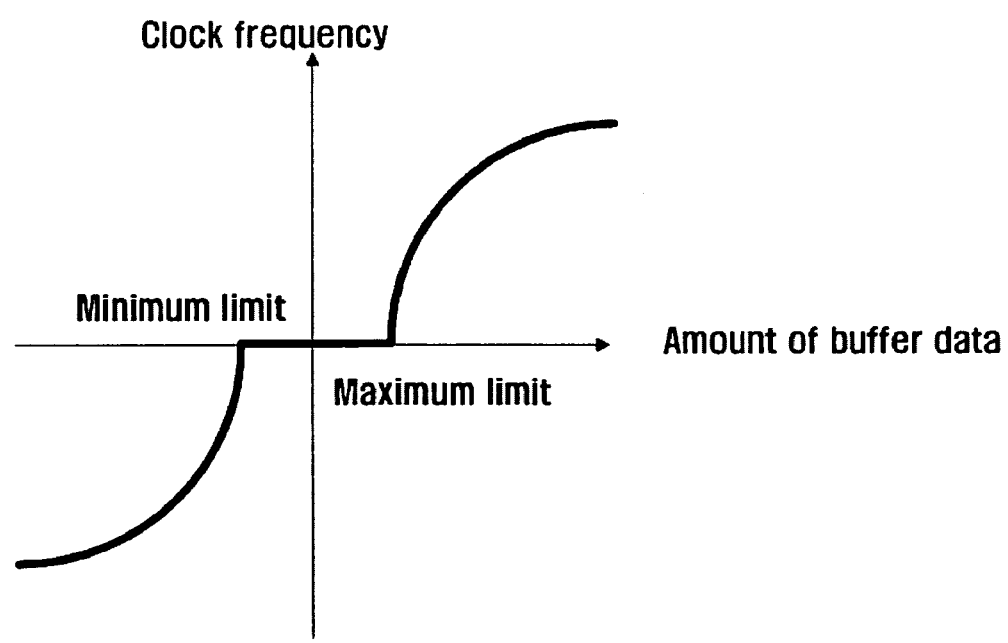
Figure 5C:
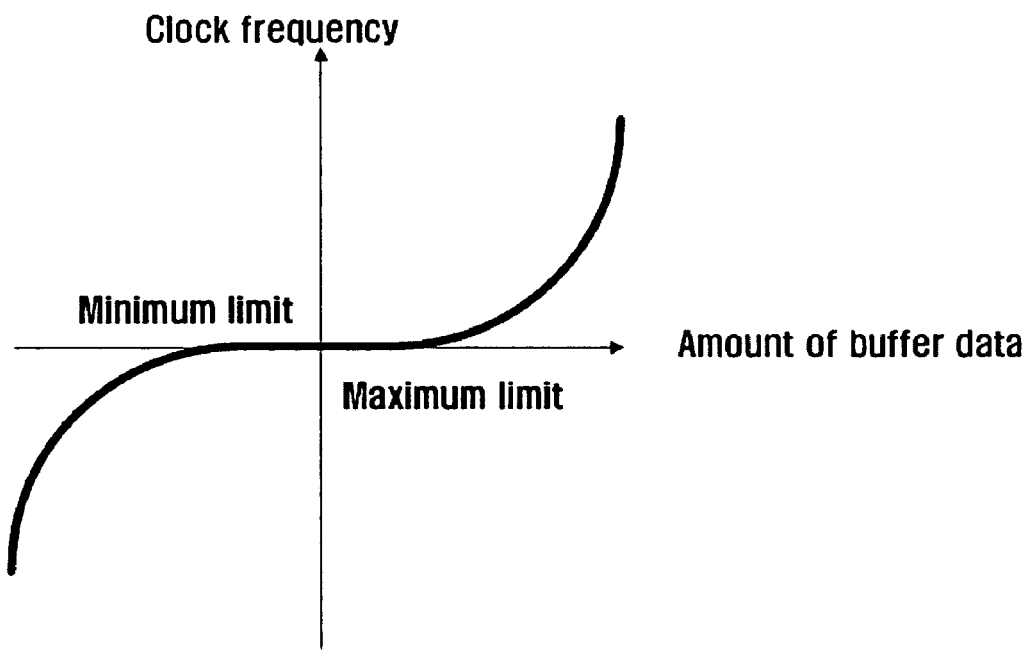
Figure 5D:
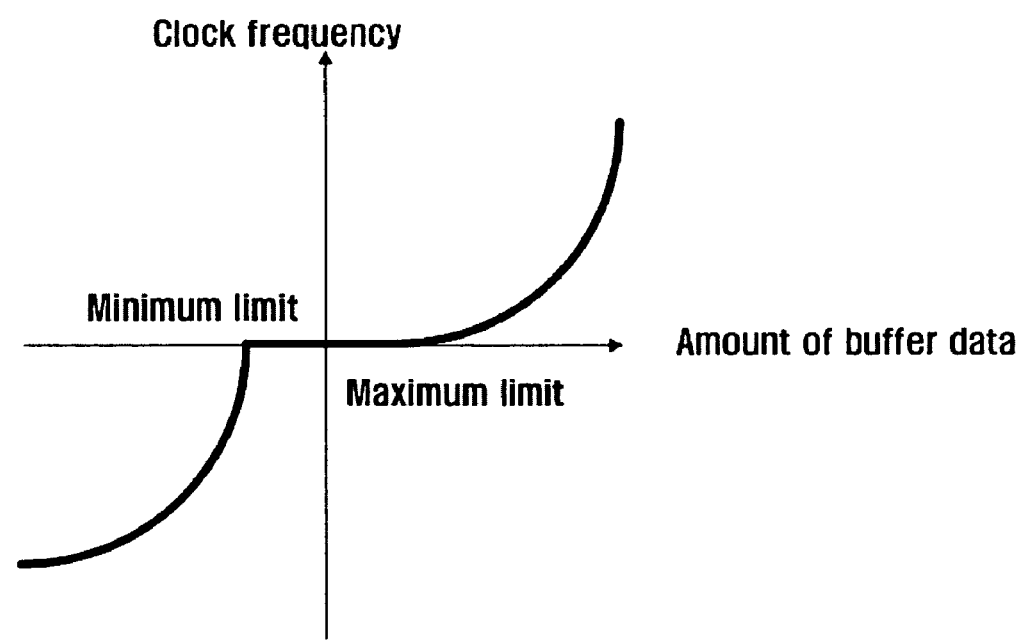

Although there may be a variety of clock control functions, the respective clock control functions should be able to adapt to the operating conditions of the streaming data receiver. FIG. 5A illustrates a linear function, FIG. 5B illustrates a lower order function than the linear function, and FIG. 5C illustrates a higher order function than linear function. On the other hand, a function order of FIG. 5D is smaller than 1 when the amount of excess buffer data has a negative value, and the function order shown in FIG. 5D is greater than 1 when the amount of excess buffer data has a positive value. Higher order functions than linear functions include quadratic functions, cubic functions, exponential functions, etc. Lower order functions than linear functions include square root functions, cubic root functions, log functions, etc.

Referring to FIG. 5A, the clock control function controls clock frequencies when the amount of buffer data is too large or too small. The clock frequencies linearly and continuously change. For example, if the same delayed clock frequency is used when the amount of buffered data is less than the minimum excessive amount of buffer data, play back speed abruptly changes at the very moment that the amount of the buffer data is beyond the minimum amount of excess buffer data. The function expressed by the graph shown in FIG. 5A is used to continuously change clock frequencies to prevent abrupt changes in the speed of play back of streaming data.

Referring to FIG. 5B, when the amount of excess buffer data is far from the minimum amount or the maximum amount of excess buffer data, the clock frequency change is accelerated. For example, when a play back unit plays a motion picture by receiving streaming data from the streaming data receiver, the clock frequencies are controlled to be delayed as late as possible until the amount of buffer data reaches the minimum amount of excess data. The function shown in FIG. 5B is advantageous in that when a user frequently retrieves certain scenes from motion pictures, initial delay time needed for buffering the initial amount of data for play back is short with respect to the function shown in FIG. 5A. Further, when overflow events occur frequently, the function shown in FIG. 5B rapidly reduces the amount of buffer data with respect to the function shown in FIG. 5A, thereby reducing the number overflow events.

Referring to FIG. 5C, when the amount of excess buffer data is far from the minimum amount or the maximum amount of excess data, the clock frequencies are changed in a small range. The function shown in FIG. 5C is used when a user does not retrieve motion pictures but only watches the motion pictures for a long time. That is, the function shown in FIG. 5C is used to raise the quality of motion pictures by changing clock frequencies as minutely as possible.

Referring to FIG. 5D, this clock control function is used when underflow events are frequently caused but overflow events are rarely caused. The clock control function shown in FIG. 5D is useful when a user retrieves certain scenes from motion pictures over transmission media through which overflow events cannot occur.

Figure 6A:
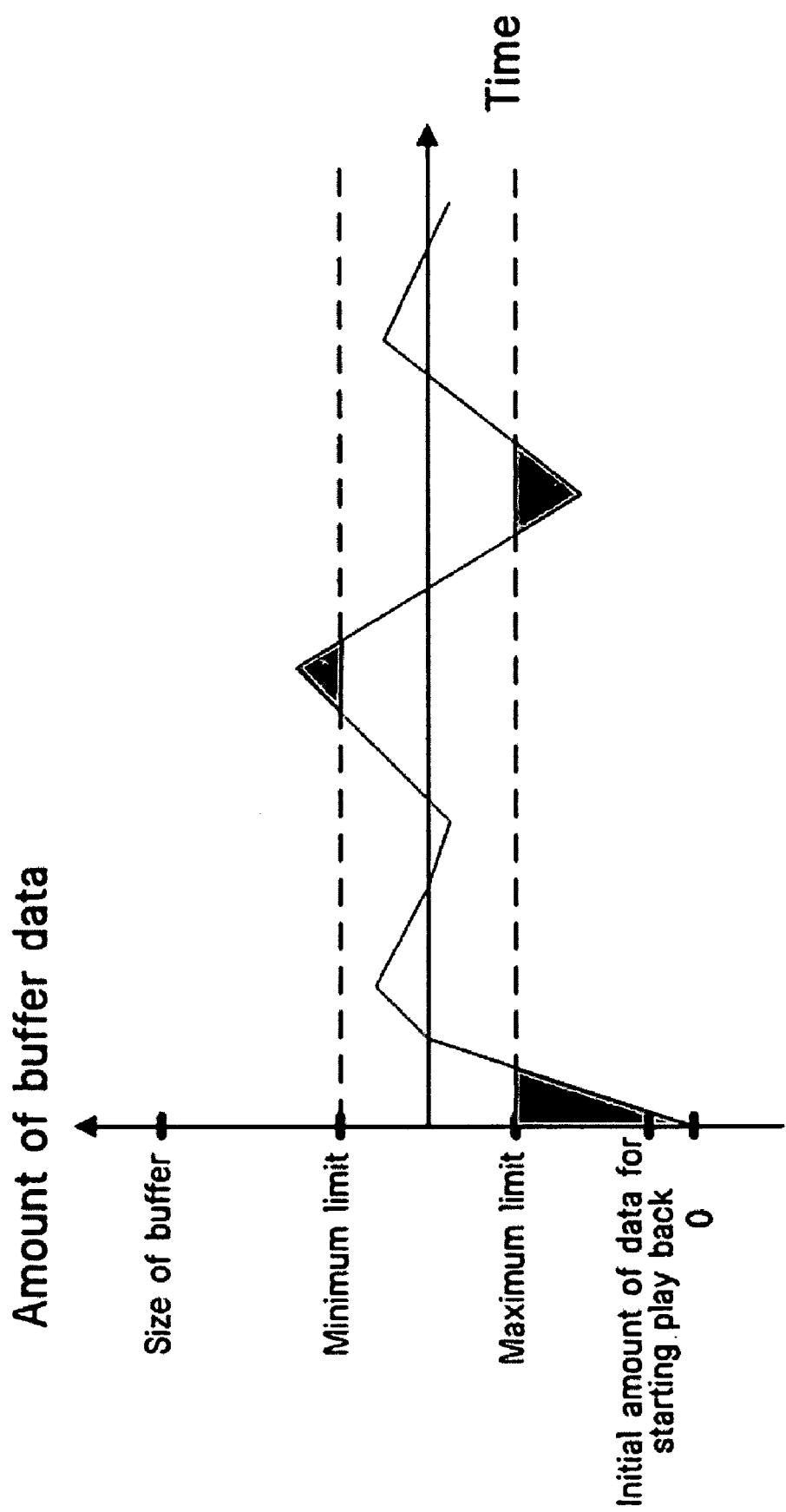
FIGS. 6A and 6B illustrate clock control ranges based on different amounts of buffer data, respectively.
Figure 6B:
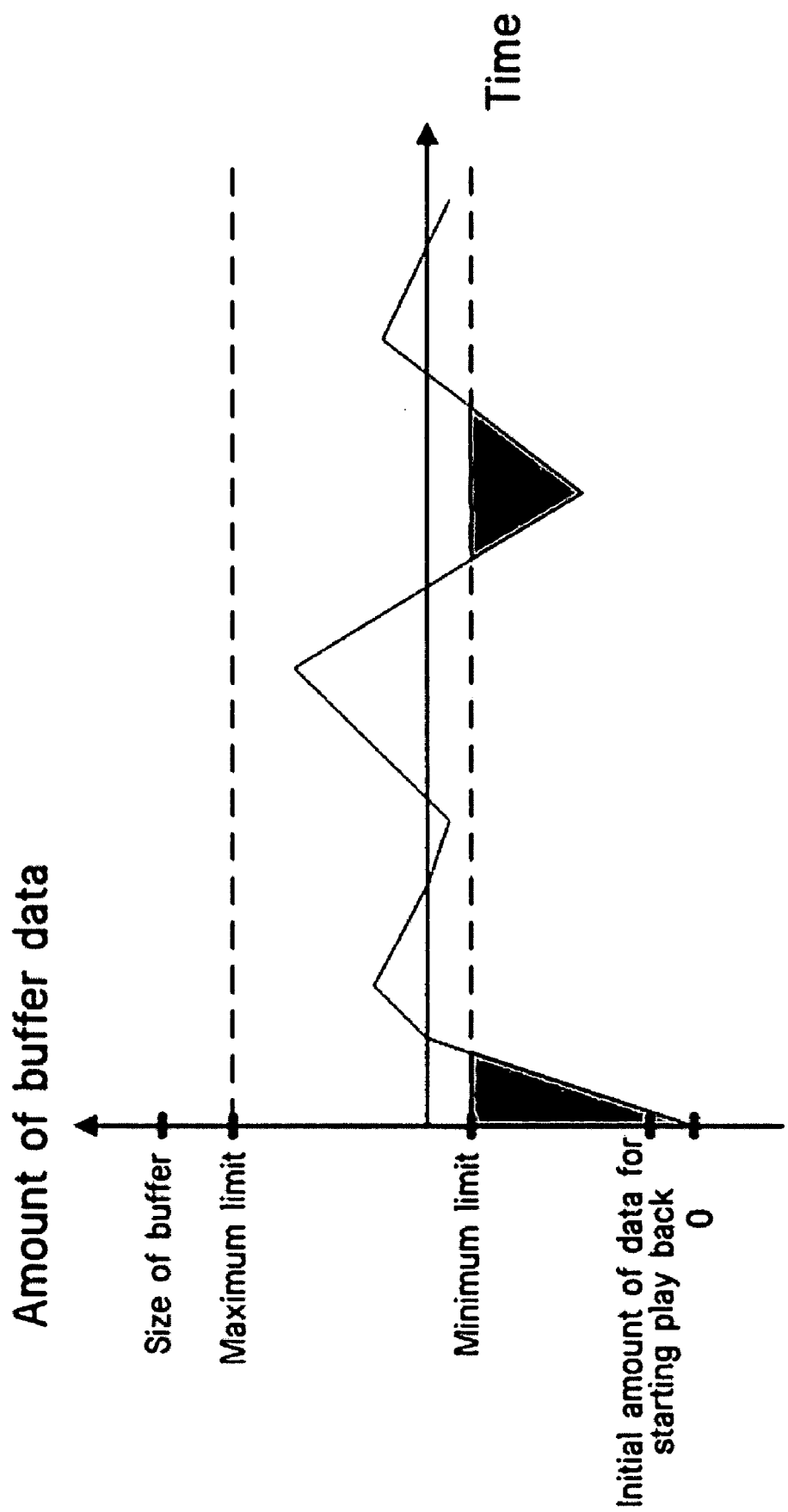

FIGS. 6A and 6B show clock control events based on the amount of buffer data.

When the amount of buffer data is in the range of the shaded area, clock control is performed. The clock is delayed when the amount of buffer data is smaller than the minimum limit and is accelerated when the amount of buffer data is larger than the maximum limit. Thus, the amount of buffer data should be kept constant as long as possible. On the other hand, the minimum limit and the maximum limit can be adjusted based on the degree of stability of a network. If a network is stable and QoS is ensured, it is preferable that the difference between the minimum limit and the maximum limit is great. If a network is not stable, it is preferable that the difference between the minimum limit and the maximum is small. Referring to FIG. 6A, the maximum limit and the minimum limit are separated from the reference value by the same distance. Referring to FIG. 6B, the maximum limit and the minimum limit can be separated from the reference value by different values. The case shown in FIG. 6B is applicable to conditions in which transmission media are congested and a transmission delay is frequently caused. That is, the case shown in FIG. 6B is applicable when the amount of buffer data is rarely larger than the maximum limit and the amount of buffer data is frequently smaller than the initial amount of data for play back. Accordingly, it is preferable to delay the clock even though the amount of buffer data slightly decreases, thereby preventing screen breaking. On the other hand, since there is probably no possibility that the amount of buffer data exceeds the maximum limit, the maximum limit is increased. Accordingly, even though the amount of buffer data slightly increases, the clock frequencies are not changed.

Figure 7:
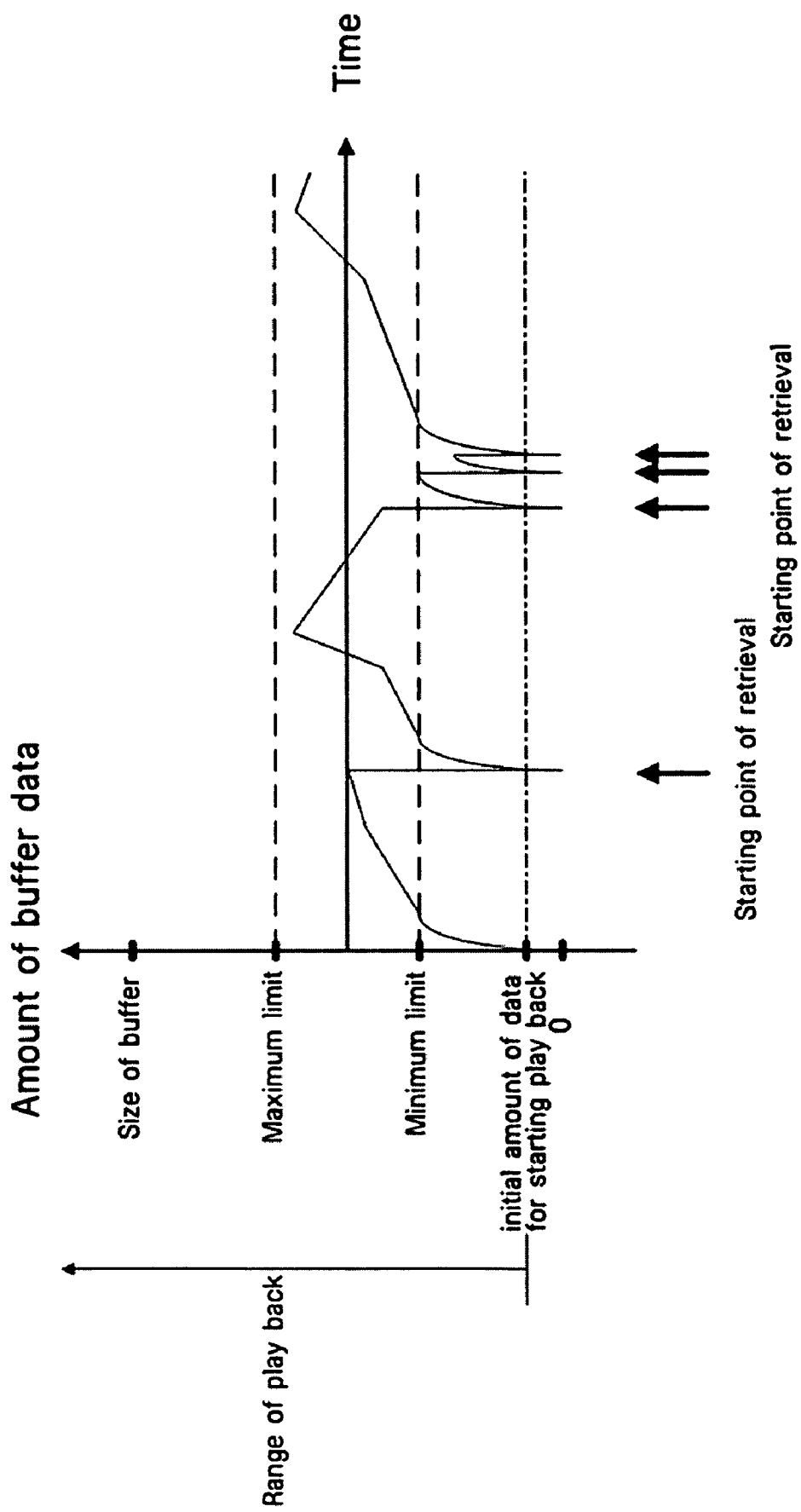
FIG. 7 is a graph showing an amount of buffer data in a data retrieval mode.

FIG. 7 shows the amount of buffer data in a mode used to retrieve streaming data.

If a user retrieves a certain scene from a motion picture, all the data buffered in the buffer is discarded and buffering is newly performed. At this time, it is very important to reduce initial delay time for buffering the initial amount of data which is needed for starting play back of streaming data. Accordingly, in this case, the clock control functions shown in FIGS. 5B and 5D are more applicable than the functions shown in FIGS. 5A and 5C.

FIGS. 8A through 8D show applications of a streaming data receiver.

Figure 8A:
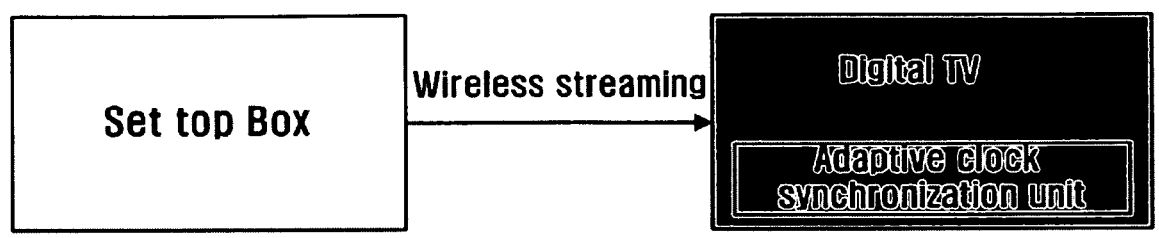
FIGS. 8A through 8D illustrate examples of a streaming data transmission and receiving system according to the present invention.

Streaming data transmission and receiving systems with a streaming data receiver can be realized in various forms. As shown in FIG. 8A, a digital television may have an adaptive clock synchronization unit because various types of delay can be caused depending the different condition of wireless transmission media when streaming data is transferred from a set top box to a digital television in a real-time basis.

Figure 8B:
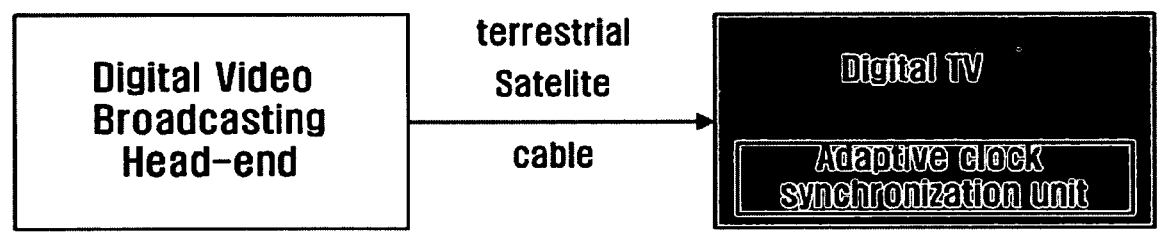

Referring to FIG. 8B, video signals are transferred to a digital television with a set top box through transmission media such as sky waves, ground waves and cables when a broadcasting station sends real-time images by a digital image emission apparatus, and the digital television plays the received video signals. In this case, the digital television may include an adaptive clock synchronization unit for preparing for delay over transmission media.

Figure 8C:
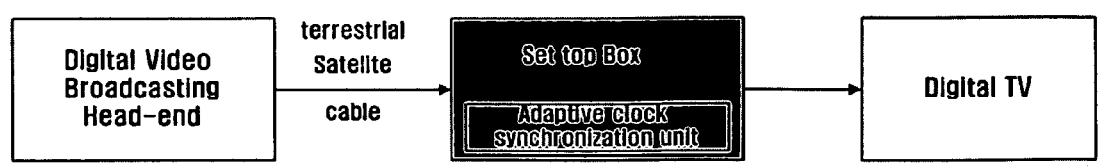

Referring to FIG. 8C, a set top box and a digital television are separately realized and a set top box may have an adaptive clock synchronization unit.

Figure 8D:
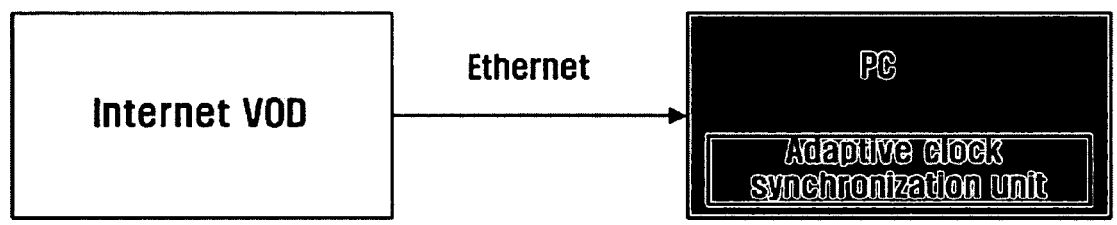

Referring to FIG. 8D, a personal computer may have an adaptive clock synchronization unit for reducing a delay effect over the Internet when an Internet VOD service provider transmits video signals to a user over the Internet.

This application is described with respect to a method of adjusting the amount of buffer data in a streaming data receiver but this invention is not limited to the streaming data receiver, and may be applied to any data communication apparatuses which need to control the amount of buffer data.

While the present invention has been particularly shown and described with reference to exemplary embodiments thereof, it will be understood by those of ordinary skill in the art that various changes in form and details may be made therein without departing from the spirit and scope of the present invention as defined by the following claims.

According to the present invention, since a streaming data receiver has an adaptive clock synchronization unit, initial delay time for buffering an initial amount of streaming data needed for starting play back is reduced. Further, a streaming data receiver can adaptively change clock control function considering network condition, amount of data stored in a buffer, the number of overflow/underflow events. By changing the clock control function, clock frequencies can be adaptively adjusted according to the operating conditions of a streaming data receiver.

What is claimed is:

1. A method of controlling an amount of buffer data in a receiver of a data communication system, comprising:
   determining a rate at which data stored in a buffer are used, considering an amount of data stored in the buffer and operating conditions of the receiver including at least one of a number of overflow/underflow events and network stability of a communication system; and
   utilizing the data stored in the buffer at the determined rate.

2. The method of claim 1, wherein the data are streaming data and the receiver is an apparatus for playing back the data stored in the buffer.

3. The method of claim 1, wherein the rate of utilizing data is determined by choosing a function of a plurality of functions, said choosing based on the operating conditions of the receiver, inputting the amount of data stored in the buffer into the function, and computing the function.

4. The method of claim 3, wherein the determined rate is expressed as a clock frequency and the receiver plays back the data stored in the buffer at the clock frequency.

5. An apparatus for controlling an amount of buffer data in a receiver of a data communication system, comprising:
   a buffer for temporarily storing data;
   an adaptive rate determination unit for determining a rate at which data is used using an amount of data stored in the buffer and operating conditions of the receiver including at least one of a number of overflow/underflow events and network stability of a communication system; and
   a data utilization unit for utilizing the data stored in the buffer at the determined rate.

6. The apparatus of claim 5, wherein the data are streaming data and the receiver is an apparatus for playing back the data stored in the buffer.

7. The apparatus of claim 5, wherein:
   the adaptive rate determination unit determines a function of a plurality of functions, said determination based on the operating conditions of the receiver;
   determines the usage rate of data stored in the buffer by choosing a function based on the operating conditions, inputting the amount of data stored in the buffer into the function and computing the function; and
   provides the determined data rate to the data utilization unit.

8. The apparatus of claim 7, wherein the determined rate is expressed as a clock frequency and the receiver plays back the data stored in the buffer at the clock frequency.

9. A method for playing back streaming data, comprising:
   storing streaming data received in real-time in a buffer,
   determining a clock frequency using an amount of data stored in the buffer and operation conditions of a receiver including at least one of a number of overflow/underflow events and network stability of a communication system, and generating a clock with the determined clock frequency; and
   playing back the data stored in the buffer in synchronization with the determined clock.

10. The method of claim 9, wherein the data stored in the buffer is MPEG data and the playing back of the data comprises decoding the data stored in the buffer in synchronization with the determined clock, and playing back the decoded data.

11. The method of claim 9, wherein:
   the storing of streaming data comprises determining a clock control function of a plurality of functions, said determining based on the operating conditions of the receiver;
   inputting the amount of data stored in the buffer into the determined clock control function to obtain the clock frequency; and
   generating clocks corresponding thereto.

12. The method of claim 11, wherein in the storing of streaming data, an order of the clock control function is determined based on information with respect to the occurrence of the overflow/underflow events.

13. The method of claim 11, wherein in the storing of streaming data, a maximum limit and a minimum limit of data amount, which are reference levels of a buffer data amount range in which the amount of buffer data is output with constant frequency, is determined by the clock control function based on information with respect to network stability.

14. The method of claim 11, wherein in the generating of a clock, the clock is generated by inputting a voltage representing the clock frequency determined in the determining of the clock frequency to a voltage controlled oscillator (VCO).

15. An apparatus of playing back streaming data in real-time, comprising:
   a buffer for temporarily storing data received in real-time by a receiver;
   an adaptive clock synchronization unit for determining a clock frequency based on an amount of data stored in the buffer and operating conditions of the receiver including at least one of a number of overflow/underflow events and network stability of a communication system, and generating a clock with the determined clock frequency; and
   a play back unit for playing back the data stored in the buffer in synchronization with the generated clock.

16. The apparatus of claim 15, wherein the data stored in the buffer is MPEG data, the playing back of the data comprises decoding the data stored in the buffer in synchronization with the determined clock, and playing back the decoded data.

17. The apparatus of claim 15, wherein:
   the adaptive clock synchronization unit receives operating conditions of the receiver;
   determines a clock control function of a plurality of control functions, said determining based on the received operating conditions of the receiver;
   obtains a clock frequency by inputting the amount of data stored in the buffer into the clock control function;
   and generates a clock corresponding to the clock frequency.

18. The apparatus of claim 17, wherein the determining of the clock control function by the adaptive clock synchronization unit comprises determining the desired order of the clock control function based on information with respect to the overflow/underflow events.

19. The apparatus of claim 17, wherein the adaptive clock synchronization unit determines the maximum limit and the minimum limit of an amount of data, which are reference levels of a buffer data amount range in which the amount of buffer data is output with a constant frequency, by the clock control function based on information with respect to network stability.

20. The apparatus of claim 17, wherein the adaptive clock synchronization unit comprises:
   a clock administration unit for determining a clock control function, considering operating conditions of the streaming data receiver;
   a clock control ratio determination unit for determining a clock control ratio based on the amount of buffer data stored in the buffer using the clock control function; and
   a clock generation unit for generating clocks with a frequency which is calculated by multiplying the clock control ratio by a reference clock frequency.

21. The apparatus of claim 17, wherein the clock generation unit comprises:
   a voltage controlled oscillator (VCO) for generating a clock with different frequencies according to voltages applied thereto; and
   a voltage supply device for generating different voltages to be applied to the VCO according to the clock control ratio received from the clock control ratio determination unit.

22. The method of claim 1, wherein the network stability of a communication system comprises an ensured quality of service (QoS) level.

23. The apparatus of claim 5, wherein the network stability of a communication system comprises an ensured quality of service (QoS) level.

24. The method of claim 9, wherein the network stability of a communication system comprises an ensured quality of service (QoS) level.

25. The apparatus of claim 15, wherein the network stability of a communication system comprises an ensured quality of service (QoS) level.

* * * * *